United States Patent
Erdoes et al.

(10) Patent No.: US 6,524,047 B2
(45) Date of Patent: Feb. 25, 2003

(54) CONTROLLED PENETRATION PEG METHOD AND APPARATUS

(76) Inventors: Brenda Erdoes, 1015 Jeanell Dr., Carson City, NV (US) 89703; Jeff Erdoes, 1015 Jeanell Dr., Carson City, NV (US) 89703

( * ) Notice: Subject to any disclaimer, the term of this patent is extended or adjusted under 35 U.S.C. 154(b) by 0 days.

(21) Appl. No.: 09/948,132

(22) Filed: Sep. 4, 2001

(65) Prior Publication Data

US 2002/0162931 A1 Nov. 7, 2002

Related U.S. Application Data

(62) Division of application No. 09/617,418, filed on Jul. 17, 2000, now abandoned.

(51) Int. Cl.⁷ .............................................. F16B 19/00
(52) U.S. Cl. .................................. 411/508; 248/309.2
(58) Field of Search ........................ 248/346.2, 309.2, 248/530, 176.1; 411/15, 19, 38, 508

(56) References Cited

U.S. PATENT DOCUMENTS

| | | | | |
|---|---|---|---|---|
| 1,207,413 A | * | 12/1916 | Kennedy | |
| 2,759,390 A | * | 8/1956 | Edwards | |
| 2,937,834 A | * | 5/1960 | Orenick et al. | |
| 2,989,968 A | * | 6/1961 | Vogel | |
| 3,118,644 A | * | 1/1964 | Wernig | |
| 3,698,144 A | * | 10/1972 | Stratton | 403/2 |
| 4,832,304 A | * | 5/1989 | Morgulis | |
| 6,196,929 B1 | * | 3/2001 | Erodes et al. | 473/160 |

FOREIGN PATENT DOCUMENTS

GB          2193550 A    *   2/1988

* cited by examiner

Primary Examiner—Korie Chan
(74) Attorney, Agent, or Firm—Herbert C. Schulze

(57) ABSTRACT

Pegs having bases and stems with bulging portions on their stems which bulging portions assist in anchoring the pegs into a medium in which they are inserted and method and means for forming the bulges by distending portions of the stems after insertion into a medium.

1 Claim, 5 Drawing Sheets

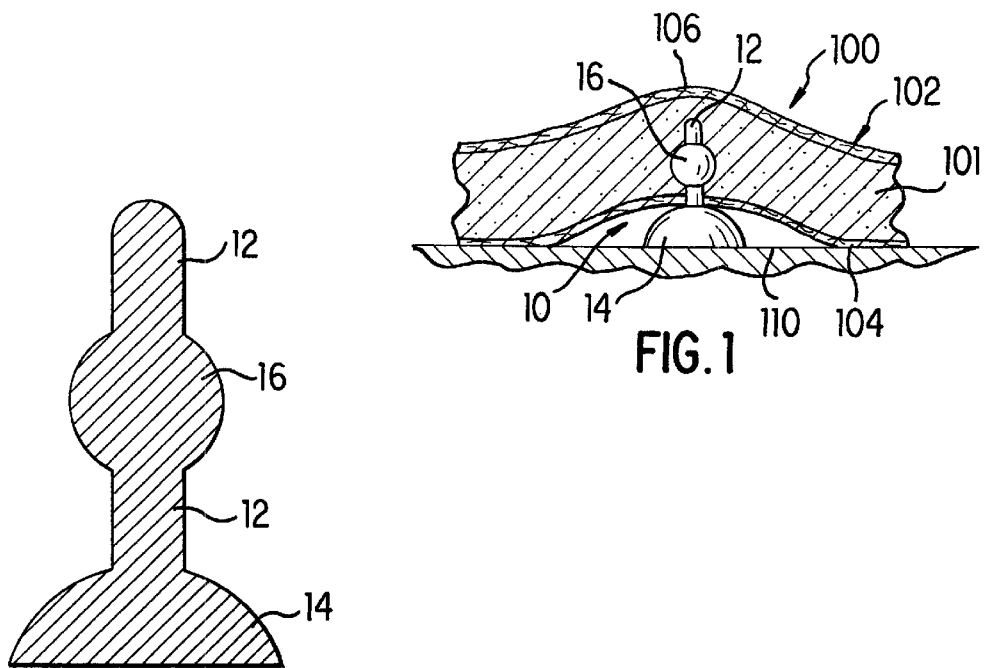
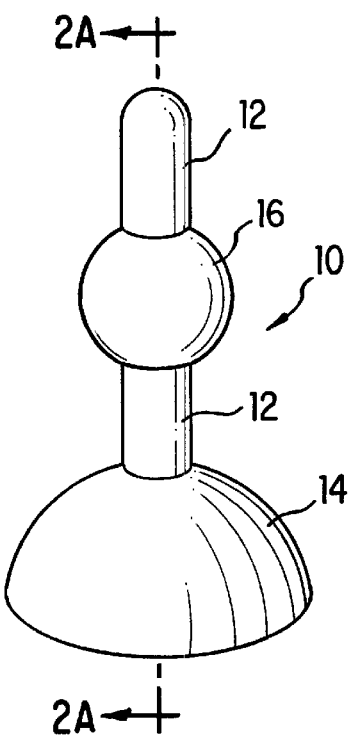

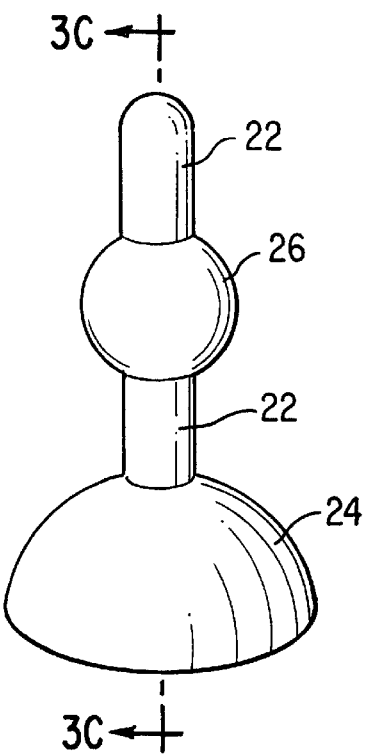
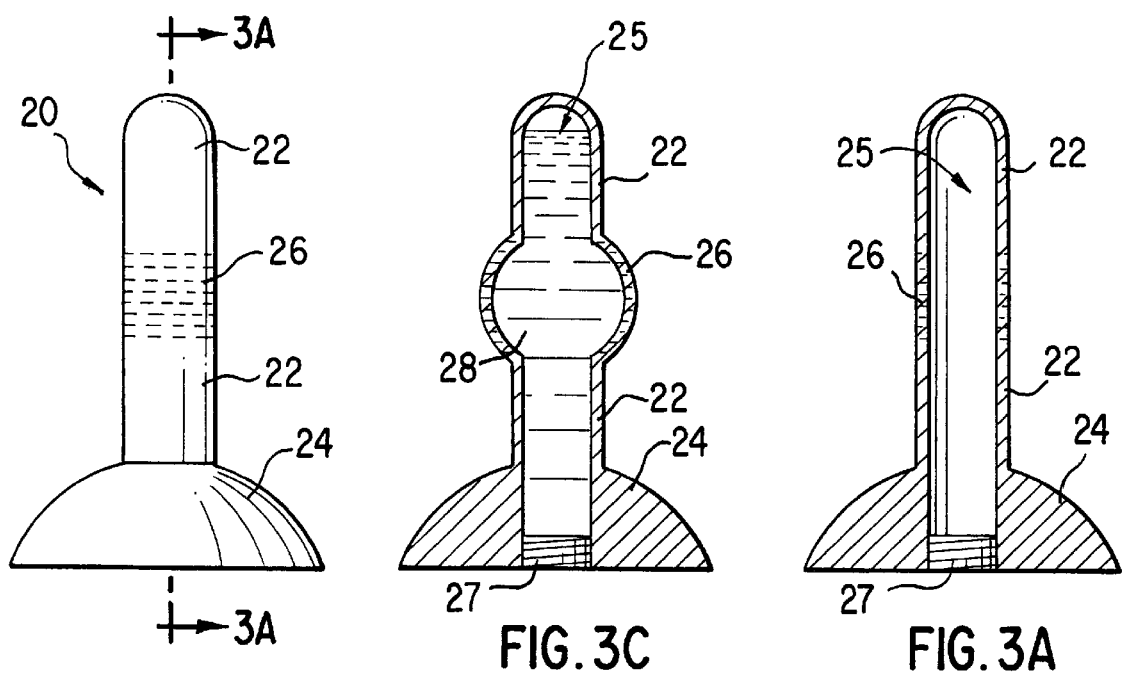
FIG. 3B
FIG. 3
FIG. 3C
FIG. 3A

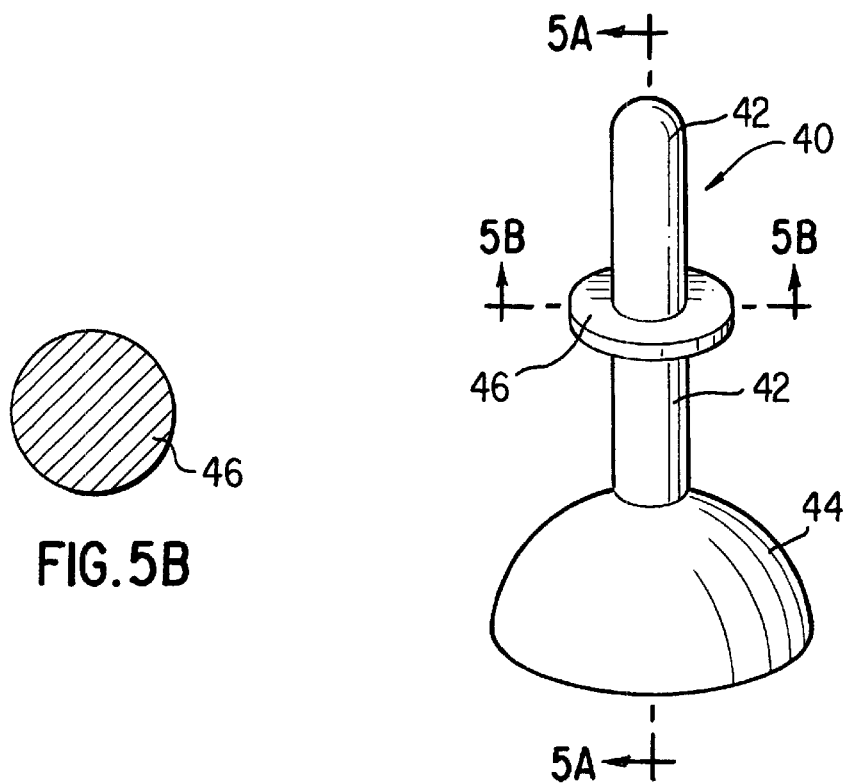
FIG.5
FIG.5B
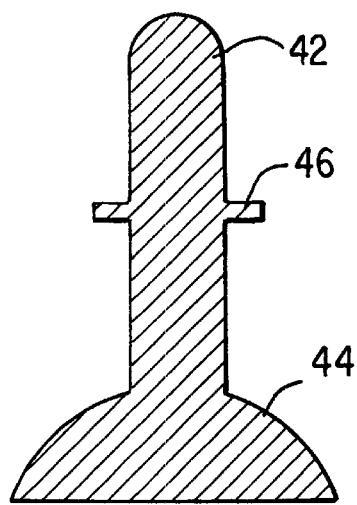
FIG.5A

CONTROLLED PENETRATION PEG METHOD AND APPARATUS

CROSS REFERENCE TO RELATED PATENT APPLICATIONS

This invention is related to our co-pending application for Golfing Game With Undulating Surface, Ser. No. 08/978,101 filed Jan. 25, 1997, now U.S Pat. No. 6,196,929, and is a Division of our co-pending application Ser. No. 09/617,418 filed Jul. 17, 2000 for Controlled Penetration Peg Method and Apparatus, now abandoned.

BACKGROUND OF THE INVENTION

I. Field of the Invention

This invention is in the general field of pegs;

The invention is more particularly in the field of pegs which may be inserted into and penetrate into mats, various materials, organic matter, inorganic matter, and other mediums;

The invnetion is even more particularly in such fields wherein it is desired to control the depth of penetration of the pegs into the medium into which the pegs are inserted;

The invention is also in the field of pegs which may be rotated in a single plane while inserted into material; and The invention is also in the field of pegs which may be maintained in axial alignment while being inserted into mediums.

II. Description of the Prior Art

There have been many different types of pegs used for a huge variety of purposes. Pegs are used, and associated by many persons as being for such purposes as stays for guy wires and the like, surveying and building markers, road markers, golfing tees, and numerous other purposes involved in insertion into soil or the like.

Pegs are used for many other purposes incluidng medical and scientific purposes and the like. Some examples of the lesser known, but important, uses for pegs will be found in U.S. Pat. No. 6,033,437 (a means for removable holding an artificial eye in a movable relationship in a human); U.S. Pat. No. 6,078,001 (winding pegs for guitars); U.S. Pat. No. 6,079,355 (aligning peg for electrode plate assembly); U.S. Pat. No. 6,079,237 (use in motor vehicle door lock); U.S. Pat. No. 6,067,837 (used in exractiing item in connection with automatic forging machines).

We have studied this field and have not found pegs with penetration and movement limiting capablities integral with, and non-interfering with proper use of, the pegs. Therefore, we have concluded that there is no directly applicable prior art anticipating nor suggesting our present invention.

SUMMARY OF THE INVENTION

Frequently it is desired, or necessary, to limit depth of penetration, or magnitude of movement, of pegs in many different situations. For example, in U.S. Pat. No. 6,033,437 this is an important factor since proper use of the artifical eye and safety and comfort of the user are at stake.

We have found no prior art in inexpensive and totally safe and effective means integral with the pegs for limiting movement or penetration of pegs. Our pegs utilized in our previously referred to patent application Ser. No. 08/978,101 can effectivly limit penetration of pegs into a material such as a mat as utilized in our golf game. However, they might be very difficult to use as a substitute for the peg of U.S. Pat. No. 6,033,437.

We have been studying this field and have now made significant advances in this art. Our advances have to do with peg insertion and movement limitation and enabling means and methods.

We have conceived and developed a system in which we utilize the principle of a bulge, or enlargement, on a peg intermediate a peg's ends to enable, and to limit, movement of a peg in certain mediums. We acomplish this by providing a bulge on a peg intermediate its ends.

The bulges we employ may be uniform, such as a globe shaped bulge, or they may be of different configurations such as a disc or the like for directional, or other added benefits.

The bulges may be of a fixed size and configuration, or they may be capable of enlargement and change of shape during use.

It is an object of this invention to provide pegs having insertion and removal enhancing features;

Another object of this invention is to provide a method for limiting the insertion rate and dimensions of insertable pegs;

Another object of this invention is to provide an improved peg for use in certain medical procedures;

Another object of this invention is to provide pegs with changeable dimensional characteristics.

The foregoing and other objects and advantages of this invention will become apparent to those skilled in the art upon reading the description of preferred embodiments, which follows, in conjunction with a review of the appended drawings.

BRIEF DESCRIPTION OF THE DRAWINGS

FIG. 1 is a schematic, partially sectioned, view of a segment of a mat with a peg suitable to practice one method of this invention;

FIG. 2 is an enlarged schematic perspective of the peg of FIG. 1;

FIG. 2A is a section on 2A—2A on FIG. 1;

FIG. 3 is a schematic side elevation of an alternate peg suitable to practice at least one method of this invention;

FIG. 3A is a section on 3A—3A on FIG. 3;

FIG. 3B is a view similar to FIG. 3 but with a deformable portion shown deformed;

FIG. 3C is a section on 3C—3C on FIG. 3B;

FIG. 5 is a schematic perspective of another alternate of a peg suitable to practice at least one method of this invention;

FIG. 5A is a section on 5A—5A on FIG. 5;

FIG. 5B is a section on 5B—5B on FIG. 5;

DESCRIPTION OF A PREFERRED EMBODIMENT

Figure 4B:
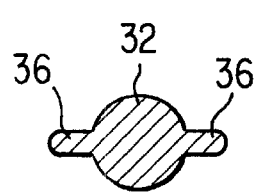
FIG. 4B is a section on 4B—4B on FIG. 4.

An inventory of items bearing reference numerals in the drawings is:

| Numeral | Item |
| --- | --- |
| 10 | peg |
| 12 | main peg stem |
| 14 | peg base |
| 16 | bulge |
| 20 | peg |
| 22 | peg stem |
| 24 | peg base |
| 25 | hollow peg center |
| 26 | resilient portion of peg stem |
| 27 | plug |
| 28 | peg filler material |
| 30 | peg |
| 32 | peg stem |
| 34 | peg base |
| 36 | peg stem protrusion |
| 40 | peg |
| 42 | peg stem |
| 44 | peg base |
| 46 | peg stem disc |
| 50 | peg |
| 52 | peg stem |
| 54 | peg base |
| 56 | resilient portion of peg stem |
| 58 | filler |
| 60 | peg holder |
| 62 | hollow interior of peg holder |
| 64 | hollow peg base cavity |
| 65 | pointed end on peg holder |
| 66 | enlarged peg protrusion accommodating cavity |
| 100 | mat |
| 101 | mat filler |
| 102 | mat cover |
| 104 | mat cover |
| 106 | mat distortion |
| 110 | base surface |

FIGS. 1, 2, and 2A should be viewed together. A peg 10 as disclosed in our referenced co-pending application is illustrated. This peg 10 is shown in FIG. 1 to be inserted into the mat 100 through mat cover 104 and into mat filler 101. The peg base 14 is resting on a base surface 110, as is the mat cover 104 except where lifted by the mat base. A peg with a straight stem would tend to fall out of place if the mat was disturbed or lifted. Our peg 10 with the bulge 16 in the middle of the stem 12 stays in position even if the mat is lifted and carried about. A small hole is cut in the mat cover 104 for easy insertion of the peg. The mat filler material 101, which may be foam or the like is easily penetrated by the bulge and then conforms around the bulge to hold the peg in place.

FIGS. 3, 3A, 3B, and 3C are best viewed together. A peg 20 is shown in FIG. 3 to consist of a base 24 with a conduit 25 in the center which continues through the length of the stem 22. The hollow stem 22 has a resilient portion 26. This will be known to those skilled in the art. The portion 26 can be formed with a reduced wall thickness or by other processes known to those skilled in the art so that it is comparatively resilient or elastic as compared to the balance of the stem. The entire stem can then be inserted into soil, flesh, or other medium. After insertion, some type of fluid, plastic, or the like 28 is inserted into the stem under pressure until the bulge 26 is formed. Plug 27 is then inserted and the peg will be held in position in whatever medium it is inserted into. While it is held in position, depending upon the medium in which it is located, it may none-the-less be rotatable which may be very advantageous for many purposes—for example, as a mount for an artificial eye or the like.

Figure 4:
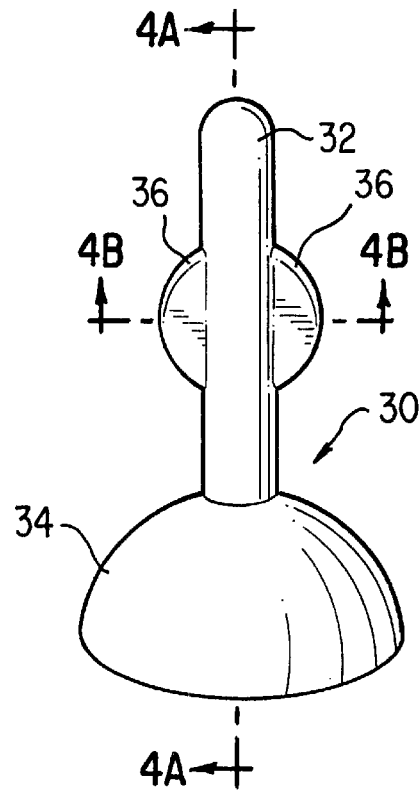
FIG. 4 is a schematic perspective of another alternate of a peg suitable to practice at least one method of this invention.
Figure 4A:
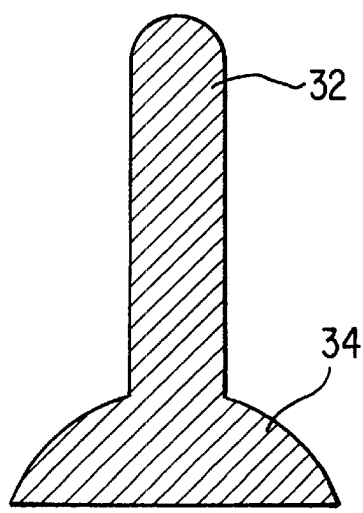
FIG. 4A is a section on 4A—4A on FIG. 4.

FIGS. 4, 4A, and 4B illustrate another embodiment of a peg utilizing the principles of this invention. In this case, a peg 30 having a base 34 and stem 32 is shown with two semi circular ribs 36 protruding from opposed sides of the stem. These ribs will hold the peg in a non-rotatable condition in a medium such as soil or the like. This can be of considerable advantage in many instances where a peg should not rotate. For example, a golf tee made in this manner may be prevented from flying out of the turf after the ball is hit, or its direction of travel can be controlled by the proper placement of guides of this nature.

FIGS. 5, 5a, and 5b show still another variation. In this case peg 40 consists of stem 42 with disc-like protrusion 46 and base 44. The disc 46 may prevent insertion of the stem into a medium such as the turf of a golfing tee area. As a sub-invention, a set of golfing tees having the disc 46 at different locations so that a ball may be teed at different elevations for special conditions of play may be advantageous.

It should be observed that the pegs of FIGS. 4, 4A, and 4B, and FIGS. 5, 5A, and 5B could b made in the manner of the pegs of FIGS. 3, 3A, 3B, and 3C, that is with a resilient area which expands into the final desired shape.

FIGS. 6, 6A, 7, 7A, and 7B show a special circumstance for the use of pegs of this invention. In this case, the pegs 50 are inserted into holders 60, which holders can be inserted into almost any medium. One especially important application is with shade umbrellas. Umbrellas are widely used on beaches, picnic grounds, lawns, and the like. Such umbrellas are easily overturned or blown away.

Figure 7B:
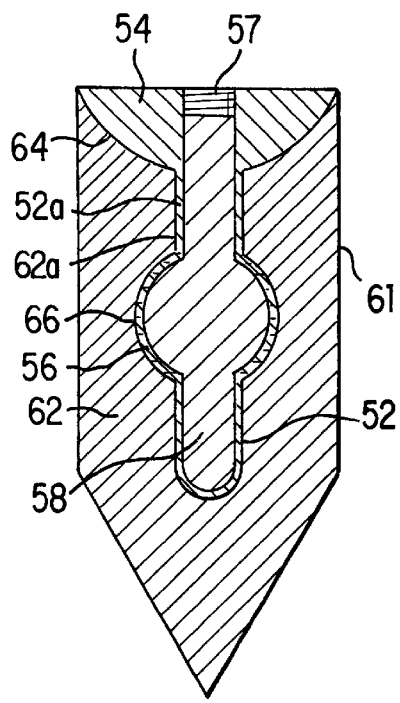
FIG. 7B is identical to FIG. 7A except that a device of FIG. 6A is in place.
Figure 7A:
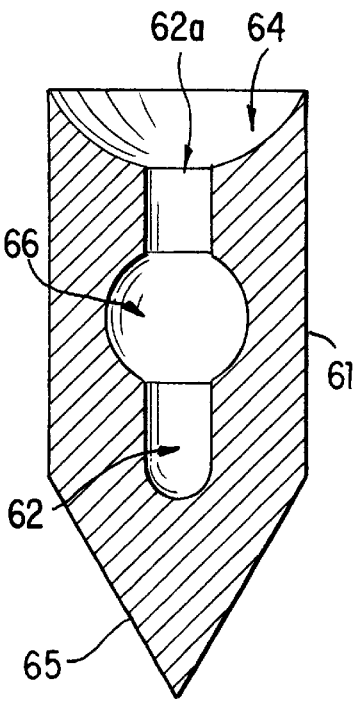
FIG. 7A is a section on 7A—7A on FIG. 7.
Figure 7:
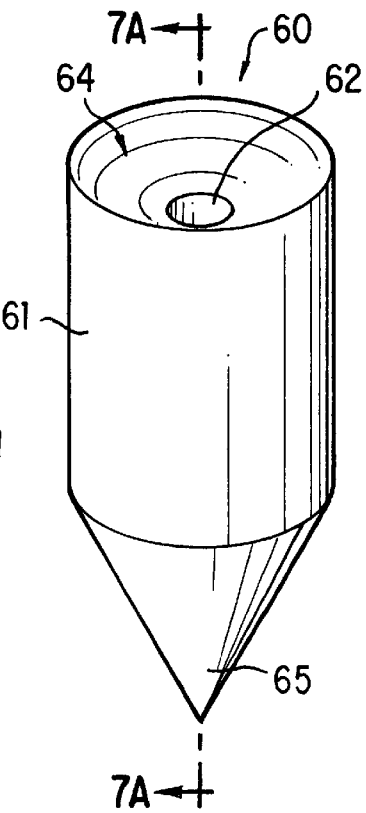
FIG. 7 is a schematic perspective of a holder for practicing at least one of the methods of this invention.

What we have shown in FIGS. 7, 7A, and 7B is a holder 60 which is a substantial stake or the like with an elongate hollow body 61 and a pointed end 65 for easy insertion into soil or sand or the like. The hollow body comprises four distinct portions being two stem receiving cavities 62, bulge cavity 66, and base cavity 64.

Figure 6A:
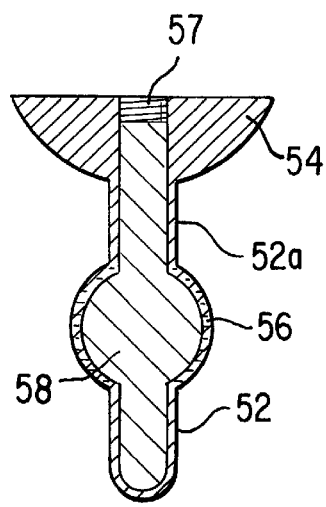
FIG. 6A is a section on 6A—6A on FIG. 6.
Figure 6:
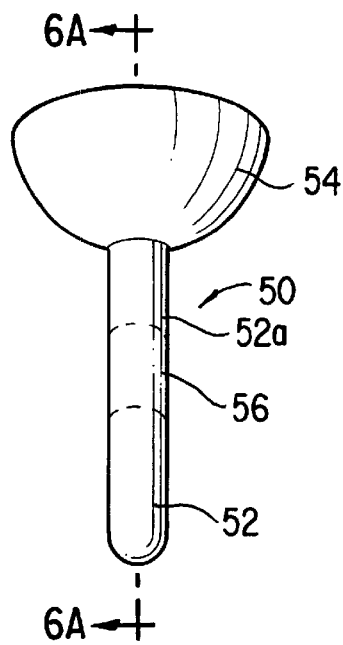
FIG. 6 is a schematic perspective of a peg similar to FIG. 3, inverted.

The various cavities are configured to accommodate the different portions of peg 50 as shown in FIGS. 6, 6A, and 7B. The peg 50 is similar to the version shown in FIGS. 3, 3A, 3B, and 3C. The peg 50 is comprised of base 54, and stem 52-56-52a. The peg 50 will be inserted into the stake 60 in the condition shown in FIG. 6. The portion 56 will be distensible. When filler 58 is applied under pressure, the distensible portion 56 expands so that peg portions 54, 52, 56, 52 fit snugly within stake cavities 64, 62, 66, 62a respectively. The umbrella (not shown) or the like can now be attached to base 54 by means known to those skilled in the art. One important method of such attachment is by having the plug 57 attached to the end of an umbrella handle and have the plug 57 threaded into threads (not shown) in the base 54.

While we have discussed a beach umbrella or the like with the version of this invention illustrated in FIGS. 6, 6A, 7, 7A, and 7B, it is to be understood that this same structure can be made in an extremely miniaturized version. For example, a version having dimensions equivalent to the dimensions which would be used with the orbital implant peg of U.S. Pat. No. 6,033,437, referred to above, could be used and is believed to be a superior orbital implant peg.

In one form, the filler 58 will be applied under pressure as a fluid until the distensible portion has expanded to a predetermined size after which the fluid will become a solid as will be known to those skilled in the art. One such filler material could be epoxy with suitable catalysts and accelerators or other activators.

In the claims which follow we may fail to claim one or more patentable features. If that occurs, it will be due to inadvertence and not due to any intent to abandon or dedicate such feature(s). In such event, immediately upon discovery of such failure to claim we shall seek to claim such feature(s) by reissue or other appropriate action.

While the embodiments of this invention shown and described are fully capable of achieving the objects and advantages desired, it is to be understood that these embodiments are for purposes of illustration only and not for purposes of limitation.

We claim:

1. A method of utilization of a peg in a medium comprising: inserting a peg having a base, a hollow stem connected to said base having a closed end at a distance from said base and a distensible segment intermediate the base and the closed end, into a medium; filling said hollow stem with a substance under pressure thereby causing the distensible segment to expand and cause a bulge intermediate said base and said closed end; and causing the substance to turn to a solid after distensible portion has been expanded to a predetermined size.

* * * * *